United States Patent
Collin

(10) Patent No.: US 12,336,450 B2
(45) Date of Patent: Jun. 24, 2025

(54) FURROW OPENER, ROW UNIT, AGRICULTURAL IMPLEMENT AND METHOD OF OPERATING A FURROW OPENER

(71) Applicant: Väderstad Holding AB, Väderstad (SE)

(72) Inventor: Morgan Collin, Mjölby (SE)

(73) Assignee: Väderstad Holding AB, Väderstad (SE)

( * ) Notice: Subject to any disclaimer, the term of this patent is extended or adjusted under 35 U.S.C. 154(b) by 803 days.

(21) Appl. No.: 17/623,833

(22) PCT Filed: Jul. 2, 2020

(86) PCT No.: PCT/SE2020/050700
§ 371 (c)(1),
(2) Date: Dec. 29, 2021

(87) PCT Pub. No.: WO2021/002798
PCT Pub. Date: Jan. 7, 2021

(65) Prior Publication Data
US 2022/0240437 A1    Aug. 4, 2022

(30) Foreign Application Priority Data

Jul. 4, 2019 (SE) .................................. 1950842-3
May 8, 2020 (SE) .................................. 2050538-4

(51) Int. Cl.
*A01C 5/06*     (2006.01)
(52) U.S. Cl.
CPC .................................. *A01C 5/064* (2013.01)
(58) Field of Classification Search
CPC ................................ A01C 5/062; A01C 5/064
(Continued)

(56) References Cited

U.S. PATENT DOCUMENTS 1,095,798 A    5/1914    Brennan, Jr.
2,091,486 A    8/1937    Paluck
(Continued)

FOREIGN PATENT DOCUMENTS

CN    206547292 U    10/2017
EP    0061066 A1 *    9/1982
(Continued)

OTHER PUBLICATIONS

Kolb et al., EP 0061066 A1 (machine translation) (Year: 1982).*
Dreyer et al., EP 1090540 A2 (machine translation). (Year: 2001).*

*Primary Examiner* — Tara Mayo
(74) *Attorney, Agent, or Firm* — COATS & BENNETT, PLLC

(57) ABSTRACT

The document discloses a seed furrow opener (21), comprising a furrow opener arm (210), and a pair of cooperating seed discs (216a, 216b), whose rotational axes (Ra, Rb) are non-parallel to each other. At least one of the seed discs (216a, 216b) is axially slidably mounted on a shaft (212a, 212b), whose proximal end is attached to the seed furrow opener arm (210). A spring (213a, 213b) is arranged to bias the seed disc (216a, 216b) outwardly from the seed furrow opener arm (210). The spring (213a, 213b) biases the seed disc (216a, 216b) against an adjustable abutment (215a, 215b). There is also disclosed a row unit comprising such a seed furrow opener, an agricultural implement comprising a plurality of such row units and a method for operating a seed furrow opener.

30 Claims, 5 Drawing Sheets

(58) Field of Classification Search
USPC .................. 111/149, 157, 158, 163–165
See application file for complete search history.

(56) References Cited

U.S. PATENT DOCUMENTS

| | | | | |
|---|---|---|---|---|
| 2,332,012 | A * | 10/1943 | Rasmussen | A01C 5/064 |
| | | | | 111/164 |
| 3,507,233 | A | 4/1970 | Greig et al. | |
| 4,009,668 | A * | 3/1977 | Brass et al. | A01C 5/068 |
| | | | | 111/164 |
| 4,031,834 | A * | 6/1977 | Klenke | A01C 7/205 |
| | | | | 111/163 |
| 4,034,688 | A | 7/1977 | Ernst | |
| 4,141,302 | A * | 2/1979 | Morrison, Jr. et al. | |
| | | | | A01C 11/006 |
| | | | | 172/170 |
| 4,206,817 | A * | 6/1980 | Bowerman | A01C 5/064 |
| | | | | 172/566 |
| 4,207,823 | A * | 6/1980 | Steilen et al. | A01C 5/06 |
| | | | | 111/164 |
| 4,275,670 | A * | 6/1981 | Dreyer | A01C 5/068 |
| | | | | 111/926 |
| 4,289,081 | A * | 9/1981 | Koronka | A01C 7/20 |
| | | | | 111/164 |
| 4,345,531 | A * | 8/1982 | Redl | A01B 77/00 |
| | | | | 111/158 |
| 4,528,920 | A * | 7/1985 | Neumeyer | A01C 7/205 |
| | | | | 111/926 |
| 4,603,746 | A * | 8/1986 | Swales | A01B 15/16 |
| | | | | 111/164 |
| 4,793,511 | A | 12/1988 | Ankum et al. | |
| 2012/0012042 | A1 | 1/2012 | Castagno Manasseri et al. | |
| 2016/0192572 | A1 | 7/2016 | Gebbeken et al. | |

FOREIGN PATENT DOCUMENTS

| | | | | |
|---|---|---|---|---|
| EP | 1090540 | A2 * | 4/2001 | ............ A01C 5/06 |
| EP | 2422599 | A1 | 2/2012 | |
| EP | 2965606 | A1 | 1/2016 | |
| FR | 2512629 | A2 | 3/1983 | |
| SU | 927158 | A2 | 5/1982 | |
| WO | 2006110103 | A1 | 10/2006 | |
| WO | 2010138068 | A1 | 12/2010 | |

* cited by examiner

FURROW OPENER, ROW UNIT, AGRICULTURAL IMPLEMENT AND METHOD OF OPERATING A FURROW OPENER

TECHNICAL FIELD

This document relates to a seed furrow opener, a row unit comprising such a seed furrow opener, an agricultural implement comprising at least two, preferably 6-30 such row units, and a method of operating a seed furrow opener.

BACKGROUND

From for example U.S. Pat. No. 3,507,233A and WO2006110103A1 there are known seed furrow openers which comprise a pair of seed discs, which by their axes of rotation being non-parallel, are disposed in V-formation, so that their peripheries meet in a single contact point.

When sowing, seed discs rotate and form, thanks to the V-shape, a seed furrow in which seed is placed via a seed duct or a coulter.

However, the seed discs are worn when used, which means that contact between the seed discs ceases and the distance between the peripheries of the seed discs grows. This can cause soil to penetrate to a greater extent between the seed discs and to create a wider ridge at the center of the seed furrow, seen across a forward direction.

The seed discs have a respective hub, with bearing, which is mounted on a shaft which is fixedly clamped relative to a seed furrow opener arm. When the seed discs are new, they are mounted with a plurality of thin spacers in the form of washers axially proximally of the bearing, whereby the bearing is pressed against the washers. When the seed discs are worn enough for the contact between them to cease, the seed disc is removed and one or more of the spacers are removed, after which the seed disc is mounted back, now with contact with adjacent seed discs. This procedure can be performed for one or both of a pair of seed discs, but is time-consuming, as it requires the dismantling of each seed disc to be adjusted. In cases where a gauge wheel overlaps and abuts the seed disc, the gauge wheel may also need to be removed before the seed disc is removed, making the procedure even more time-consuming.

In U.S. Pat. No. 3,507,233A an alternative is shown, where the seed discs are biased against each other by respective helical springs.

In WO2006110103A1, another alternative is shown where the seed discs are biased against each other by being arranged on each one of a pair of opener arms and by the seed furrow opener arms being biased against each other.

However, such arrangements as disclosed in U.S. Pat. No. 3,507,233A and WO2006110103A1 have been found to be sensitive to the forces exerted by the opener in use causing the plates to separate from one another, for example, as a result of stones or harvest residues penetrating between the seed discs.

Thus, there is a need for an improved attachment of seed discs, and especially a fastening that facilitates handling of the wear on the seed discs.

SUMMARY

One object is thus to provide a seed furrow opener which facilitates the handling of wear on the seed discs.

The invention is defined by the appended independent claims. Embodiments are apparent from the dependent claims, from the following description, and from the accompanying drawings.

According to a first aspect, there is provided a seed furrow opener, comprising a seed furrow opener arm, and a pair of cooperating seed discs, whose axes of rotation are non-parallel to each other. At least one of the seed discs is axially slidably mounted on a shaft, whose proximal end is attached to the seed furrow opener arm. A spring is arranged to bias the seed disc outwardly from the seed furrow opener arm. Furthermore, the seed furrow opener has an adjustable abutment, whereby the spring biases the seed disc towards the abutment.

By the seed discs being "cooperating" is meant that they are arranged so that they together form a seed furrow. Because the rotary axes of the seed discs are non-parallel to each other, the seed discs, seen in cross-section, form a "V", with the tip pointing forward. The periphery of the seed discs thus tangents one another at a point of contact. The axes of the seed discs may be symmetrical about a plane containing such a contact point. Alternatively, the shafts may be slightly offset in the plane, so that the front portion of one seed disc is slightly above the front portion of the other, seen in a forward direction.

By such an arrangement, the seed discs can be adjusted without being removed from the shaft. By the spring biasing the seed disc outwards against an adjustable abutment, the risk of the seed disc springing outwards is reduced.

It will be appreciated that one of the seed discs may be slidably mounted on its shaft, while the other may be fixed. Alternatively, both seed discs may be slidably mounted.

The seed furrow opener may further comprise an inner abutment, arranged axially inwardly of the spring.

The shaft may be integrally formed in one piece with the inner abutment.

The shaft may, at a proximal portion thereof, be threadedly mounted in the inner abutment.

The shaft may have an engaging portion arranged at a distal portion thereof for mounting and/or disassembly of the shaft.

The adjustable abutment may comprise a threaded portion for engaging the shaft.

The adjustable abutment may comprise a nut which engages an outer thread provided on the shaft.

The adjustable abutment may further comprise a screw which engages with an inner thread in the shaft, a head of the screw being abutable against an axially exposed surface of the nut.

Thus, a counter-connection can be provided between the screw and the nut, which reduces the risk of the nut being unintentionally turned and thus inadvertently changing the axial position of the seed disc along the shaft.

The screw and nut may have threads with different pitch angles.

Because one of the screw and the nut has a thread with a greater pitch angle than the other one of the screw and nut, the risk of the counter-connection thus formed being unlocked is reduced.

The screw and the nut may have threads with opposite thread directions.

Because one of the screw and the nut is right-threaded and the other one of the screw and the nut is left-threaded, the risk of the counter-connection thus formed being unlocked is reduced.

The adjustable counter-connection may include a counter nut, for locking the nut.

The outer thread can have a greater axial length than the nut.

Thus, further tightening of the nut is always allowed, which makes it possible to relieve the engagement with the head of the screw and thereby facilitating the unlocking of the joint.

The seed furrow opener may comprise a pair of substantially opposite shafts, with a respective adjustable abutment, each having an adjustable counterbore, and a nut associated with an abutment of a first one of the shafts may have the same thread direction as a nut associated with an abutment of a second one of the shafts.

Thus, it is possible to provide both the adjustable abutments of the seed furrow opener with identical nuts and screws, which allows reducing the number of articles to be manufactured and stored.

The adjustable counter support may comprise a bolt which engages with an inner thread arranged in the shaft.

The spring may be concentrically disposed on the shaft.

The spring may comprise at least one, preferably two to five, plate springs.

Such plate springs may be arranged in pairs. Thus, each shaft can have two, four or six plate springs, which are arranged in pairs opposite.

The seed furrow opener may further comprise a roller bearing which acts between the seed disc and the shaft, wherein the spring and the adjustable abutment engage an inner ring of the rolling bearing.

Both seed discs can be slidably arranged on their respective shaft and comprise a respective arrangement of outwardly biased spring and adjustable abutment.

According to a second aspect, a row unit for supplying granular material to the ground is provided, comprising a seed furrow opener as described above.

The row unit a can further comprise at least one gauge wheel, which has a gauge wheel hub and a tread and a radially therebetween located intermediate portion, said gauge wheel overlaps the seed disc, so that the shaft is located radially inside the tread, wherein the intermediate portion is perforated, so the adjustable abutment is accessible through the gauge wheel.

Because the intermediate portion is perforated, it is possible to access the adjustable abutment through the gauge wheel, so that the axial position of the seed disc can be adjusted without the seed disc having to be removed and without having to remove the gauge wheel.

The gauge wheel can bear against the seed disc.

In a third aspect, there is provided an agricultural implement for feeding the granular material to ground over which the agricultural implement travels, comprising at least two row units according to what was described above.

According to a fourth aspect, there is provided a method of operating a seed furrow opener, comprising providing a seed furrow opener arm, which carries a pair of cooperating seed discs, whose axes of rotation are non-parallel to one another, providing at least one axially acting spring element on at least one of the shafts, providing a seed disc on said at least one of the shafts, and biasing the seed disc towards the spring element by means of an adjustable abutment.

In the method, the biasing may be accomplished by engaging the adjustable abutment by a biasing tool through an axially open recess in a gauge wheel overlapping the seed disc.

The method may further comprise locking the axial position of the adjustable abutment.

The axial position of the adjustable abutment may be locked by means of a counter-screw or counter nut.

DETAILED DESCRIPTION

Figure 1:
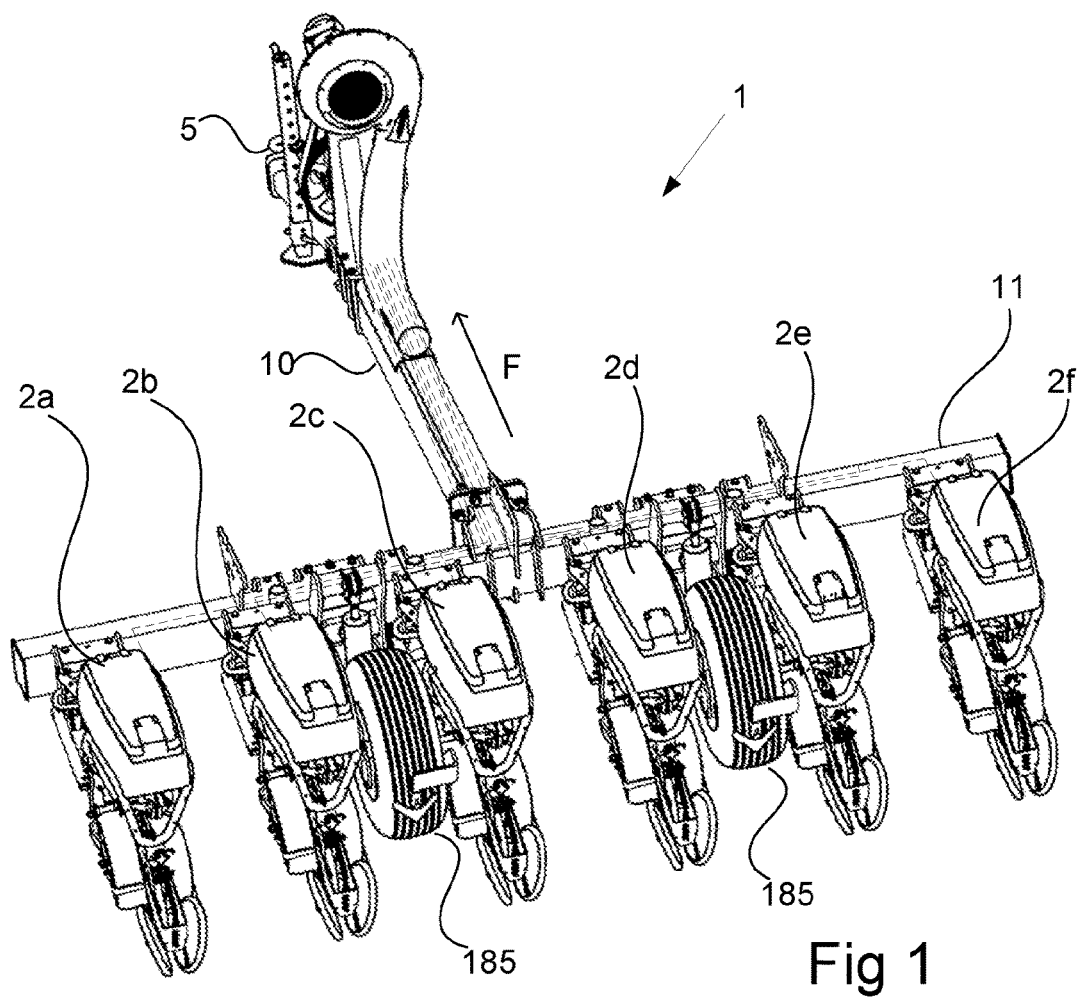
FIG. 1 is a schematic perspective view of a precision seed drill with six row units.

FIG. 1 shows a perspective view of an agricultural implement 1 in the form of a precision seed drill.

The agricultural implement 1 comprises a number, in this example six, output units 2*a*-2*f,* also called "row units", which are arranged side by side and connected to a transverse beam 11, which forms part of a frame supported by two wheels 18S. The agricultural implement 1, by means of a fastening member 5 arranged at a free end of a longitudinal beam 10, is arranged to be coupled to a traction vehicle, such as a tractor and intended to be driven in a forward direction indicated by the arrow F.

Each of the output units 2*a*-2*f* has a planting device, which is arranged to form a seed furrow in the driving direction of the agricultural implement 1, when the agricultural implement 1 moves over the soil to be sown, to feed material, in this case the seed, and possibly also fertilizer and/or pesticide, to the seed furrow, after which it is closed. In the example shown, each output unit 2*a*-2*f* has its own drive device (not shown), which may include an electric motor as well as a local controller, which controls the drive device and acts as an interface to a central controller.

The output devices 2*a*-2*f* may be movably secured to the agricultural implement frame 10, 11. For example, the output devices 2*a*-2*f* may be secured via a parallel linkage which may be spring loaded and/or adjustable by means of an actuator, such as a hydraulic actuator.

Thus, in the example shown, the seed drill is a so-called precision seed drill, i.e. a seed drill that singles the granules, such as seeds, to be distributed, and places them one by one at a certain distance in the forward direction.

It will be appreciated that the invention can also be applied to other types of drills, such as volumetric drills, and especially to drills where the row units can be controlled individually or in groups with respect to the output amount of material per unit length.

In addition, the invention can be applied to machines for distributing pesticides and/or fertilizers, in solid or liquid form, provided also that dispensing nozzles are individually or in groups controllable.

Figure 2:
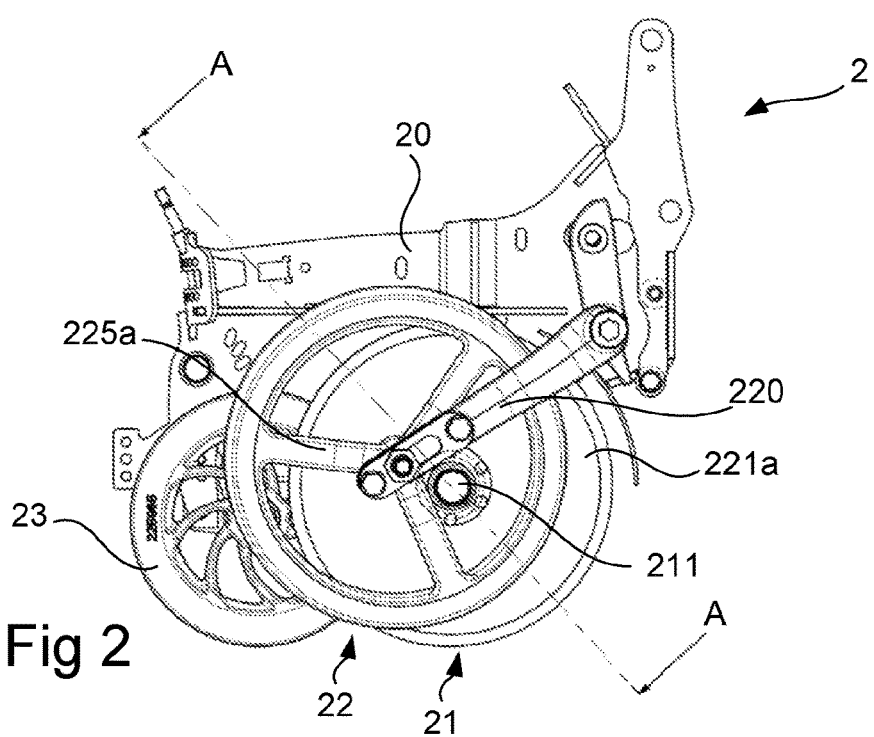
FIG. 2 shows a schematic side view of part of a row unit.

FIG. 2 shows a side view of a row unit 2 that can be used in the agricultural implement shown in FIG. 1, as well as in other precision or volumetric seeding drills.

The row unit comprises a row unit frame 20 which is attached to a transverse beam of the agricultural implement via an attachment device, which may comprise a parallel link arrangement.

The row unit 2 comprises a seed furrow opener 21, the purpose of which is to form a seed furrow in the soil, extending along the forward direction F of the agricultural implement.

The row unit 2 may further comprise a carrier device 22, the purpose of which is to control a working depth for the seed furrow opener 21.

The row unit 2 may further comprise a pressure wheel 23, the purpose of which is to catch and/or press the feed material, to ensure correct placement in the seed furrow.

In addition, the row unit 2 may comprise a seed furrow closer (not shown), a feeding device which may comprise a singulator (not shown) and a container for the material to be fed.

The seed furrow opener will now be described in more detail with reference to FIGS. 3 and 4a-4b.

A seed furrow opener arm 210 is formed as part of the row unit frame 20, or as a separate part, which may be movable, such as rotatable, relative to the row unit frame.

The seed furrow opener arm 210 may extend downwardly from the row unit frame 20 to support the seed furrow opener 21 at its lower portion.

The seed furrow opener 21 comprises a hub unit 211, which forms an interface between on the one hand the seed furrow opener arm 210 and on the other hand a pair of seed discs 216a, 216b.

The hub unit 211 may be fixed or movable relative seed furrow opener arm 210. A rotatable hub assembly 211 may permit adjustment of a height position of a contact point of the seed discs.

The hub unit 211 comprises a pair of shafts 212a, 212b defining respective axes of rotation Ra, Rb of the seed discs 216a, 216b. The axes of rotation Ra, Rb form an obtuse angle with each other, which may be in the order of 165-179 degrees, preferably 167-172 degrees.

The shafts 212a, 212b may be integrated with each other, directly or via a base portion 217. The shafts may be connected to the base portion 217 via weld or thread. Alternatively, the hub unit 211, including at least the base portion 217 and shafts 212a, 212b, may be manufactured in one piece, for example, by milling, or by casting followed by milling or turning.

The base portion 217, or a shoulder formed on the shaft, may constitute an inner abutment against which the spring 213a, 213b may act.

The spring 213a, 213b may be formed by one or more spring elements. Spring elements may be selected as appropriate, for example as compression springs, such as coil springs, spring washer, rubber washer or, as shown herein, plate spring.

The spring 213a, 213b is arranged around the shaft 212a, 212b, at the proximal end of the shaft, that is, the end of the shaft which is innermost, closest to the base portion 217 or the seed furrow opener arm 210.

A bearing unit 214a, 214b is provided on the shaft. The radially inner part of the bearing unit abuts the shaft so that gaps are avoided, but so that the bearing unit can be displaced along the shaft.

For example, the bearing unit 214a, 214b may be a single or two-row roller bearing, which may include an inner ring and an outer ring (not shown).

The seed discs 216a, 216b are mounted to the radially outer portion of the bearing unit 214a, 214b in a manner known per se.

Axially outside the bearing unit, an abutment is provided, which in the example shown can take the form of a bolt 215a, 215b, which is threaded into a hole threaded internally in the shaft 212a, 212b, which is open at the distal portion of the shaft.

The abutment may be a flange bolt or a bolt and washer.

Alternatively, the distal portion of the shaft 212a, 212b may be externally threaded, whereby the abutment may be a nut which engages an externally thus threaded portion. Such a nut can be supplemented by a counter nut, to counteract unintentional change of the position of the nut.

By tightening the abutment, the spring 213a, 213b is compressed at the same time as the seed discs are axially displaced towards each other.

By designing the seed furrow opener 21 so that the seed discs 216a, 216b initially contact each other at a single point along their peripheries, and the springs 213a, 213b in this position are only uncompressed or only slightly compressed, wear on the seed discs can be handled and compensated for by tightening the abutment so that one or both seed discs are axially displaced towards the other of the seed discs until they again contact each other at a single point along their peripheries.

The carrier comprises a pair of gauge wheel arms 220a, 220b, which may be adjustably pivotable relative to the row unit frame 20. Each gauge wheel arm 220a, 220b carry, at a distal portion thereof, a gauge wheel 221a, 221b.

Each gauge wheel 221a, 221b may have a gauge wheel hub 222a, 222b, a tread 223a, 223b, and an intermediate portion 224a, 224b extending radially between the gauge wheel and the tread.

In the example shown, the intermediate portion 224a, 224b is perforated, which can be accomplished by providing the intermediate portion with one or more holes, or by forming the intermediate portion by one or more spokes.

As can be seen in FIG. 2, the gauge wheels 221a, 221b are arranged so that, viewed from the side, they partially overlap the seed discs 216a, 216b. Specifically, the seed discs overlap to such an extent that the hub unit 211 of the respective seed disc is radially within the periphery of the respective gauge wheel.

Figure 3:
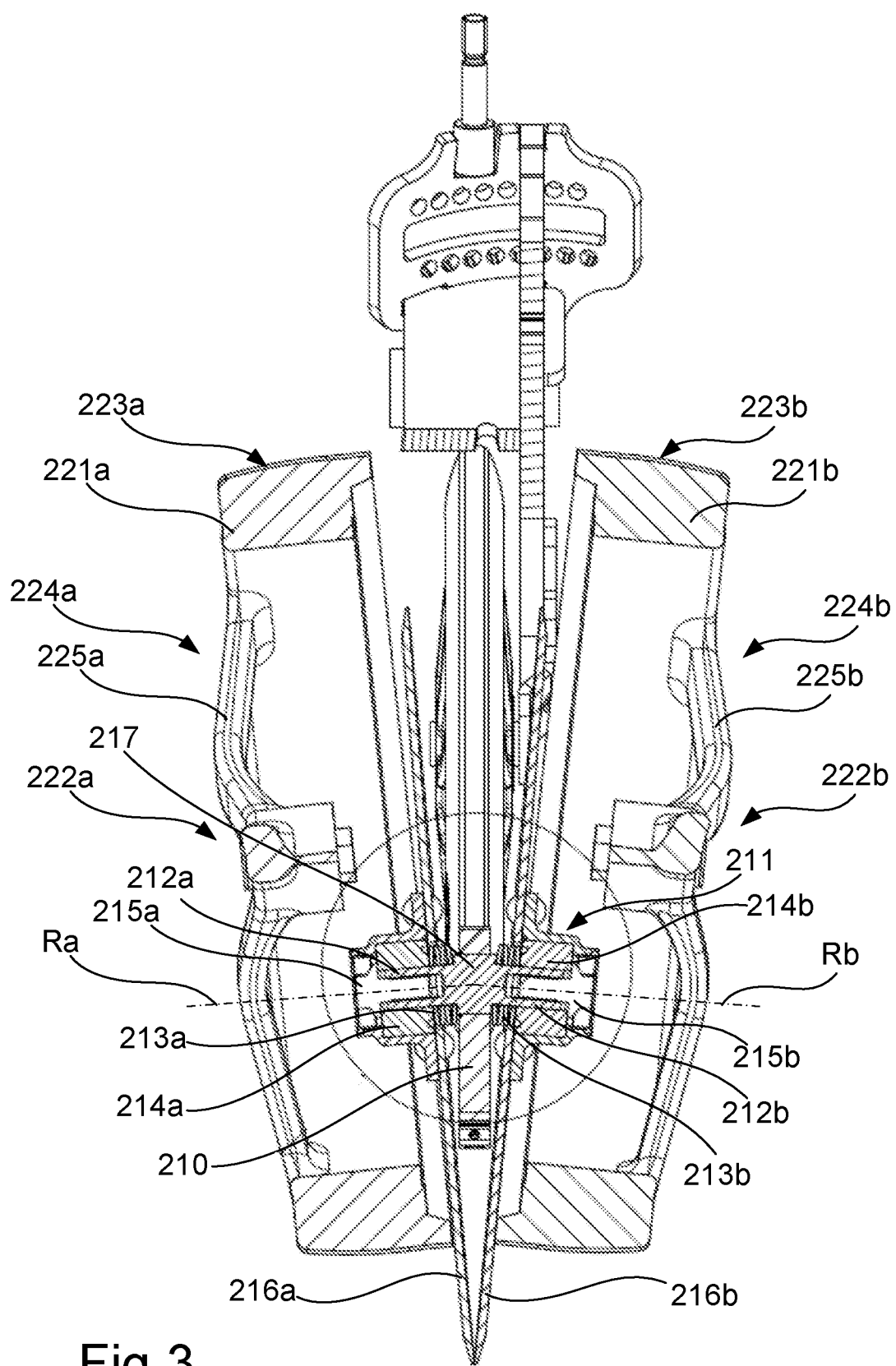
FIG. 3 is a sectional view taken along line A-A of FIG. 2.
Figure 4A:
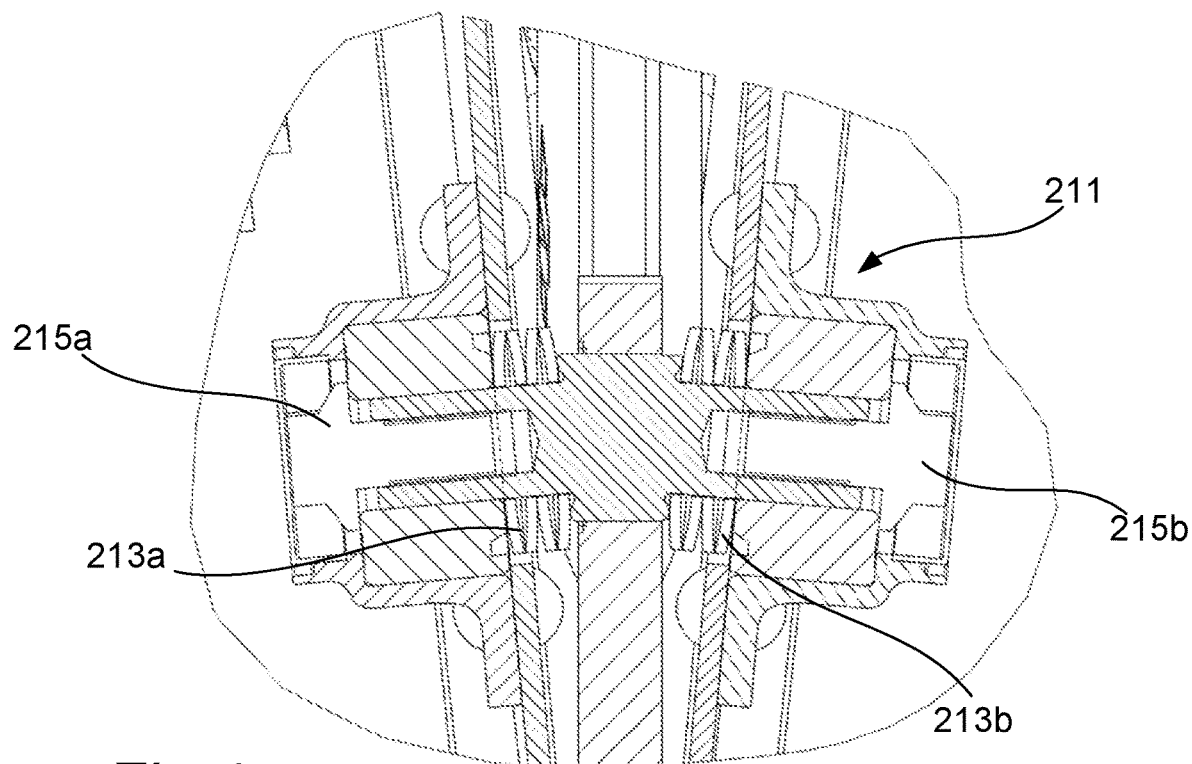
FIGS. 4*a*-4*b* show enlargements of the hub unit of the seed furrow opener, seen in the same section as in FIG. 3.
Figure 4B:
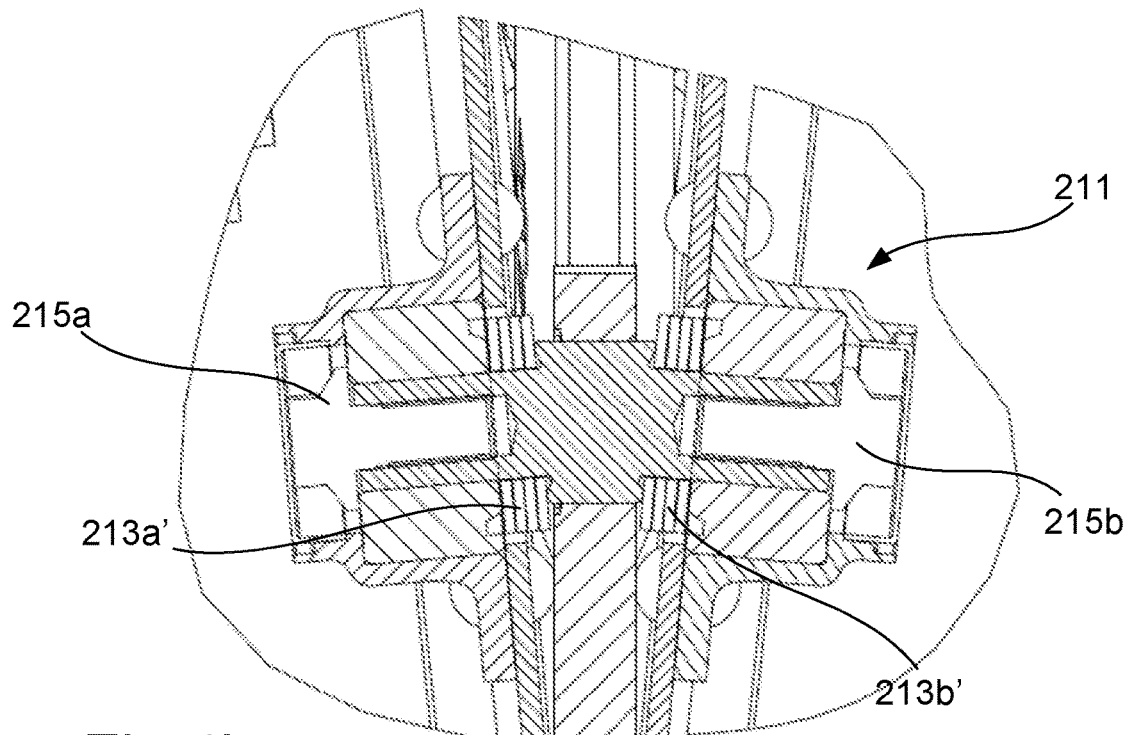

FIGS. 4a and 4b show an enlargement of the hub unit 211 in FIG. 3.

In the condition shown in FIG. 4a, the springs 213a, 213b are in an expanded state, as is the case when new or non-worn seed discs are mounted on the hub unit 211.

It can be seen from FIG. 4a that the springs are disc springs arranged in pairs, each pair being symmetrical about a plane perpendicular to the shaft 212a, 213b.

In the condition shown in FIG. 4b, the bolts 215a, 215b have been tightened to compress the springs 213a ', 213b' maximally, as is the case when the seed discs are almost or completely worn out.

Figure 5A:
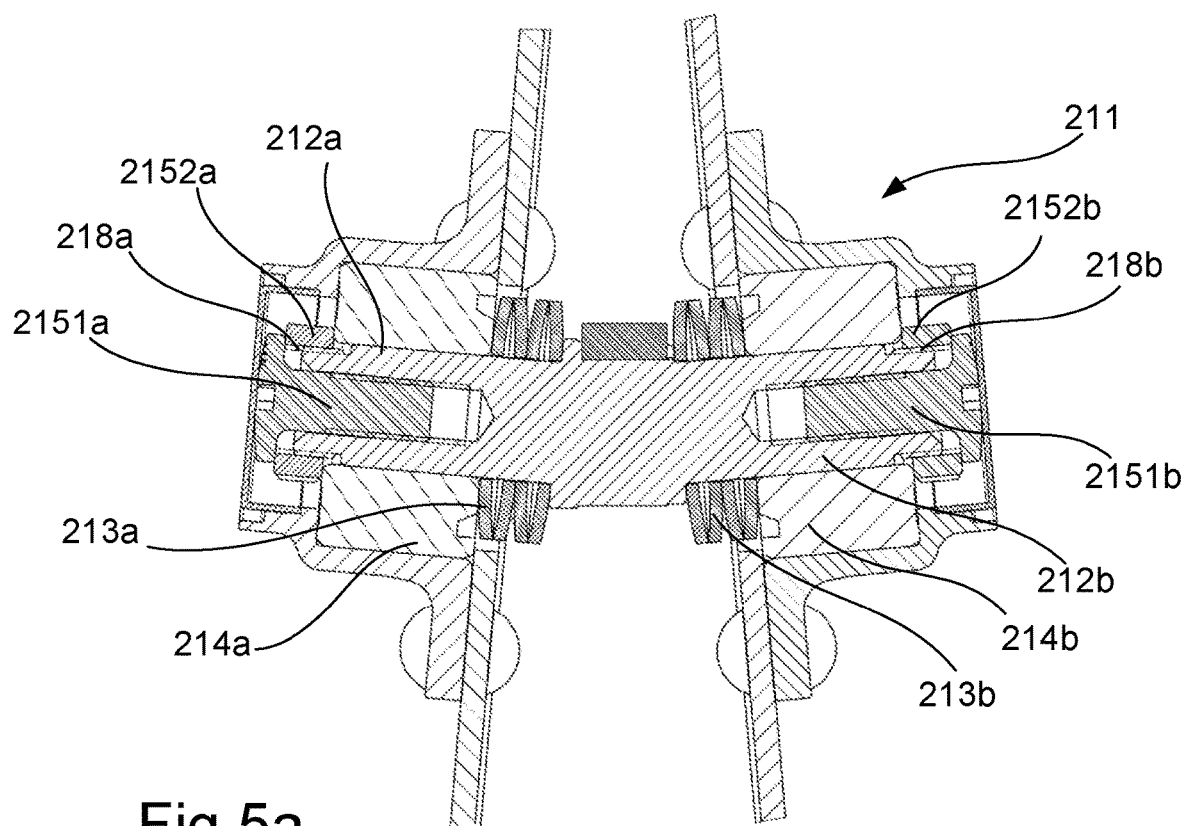
FIGS. 5*a*-5*b* show enlargements, corresponding to FIGS. 4*a*-4*b*, of the hub unit of the seed furrow opener according to an alternative embodiment.
Figure 5B:
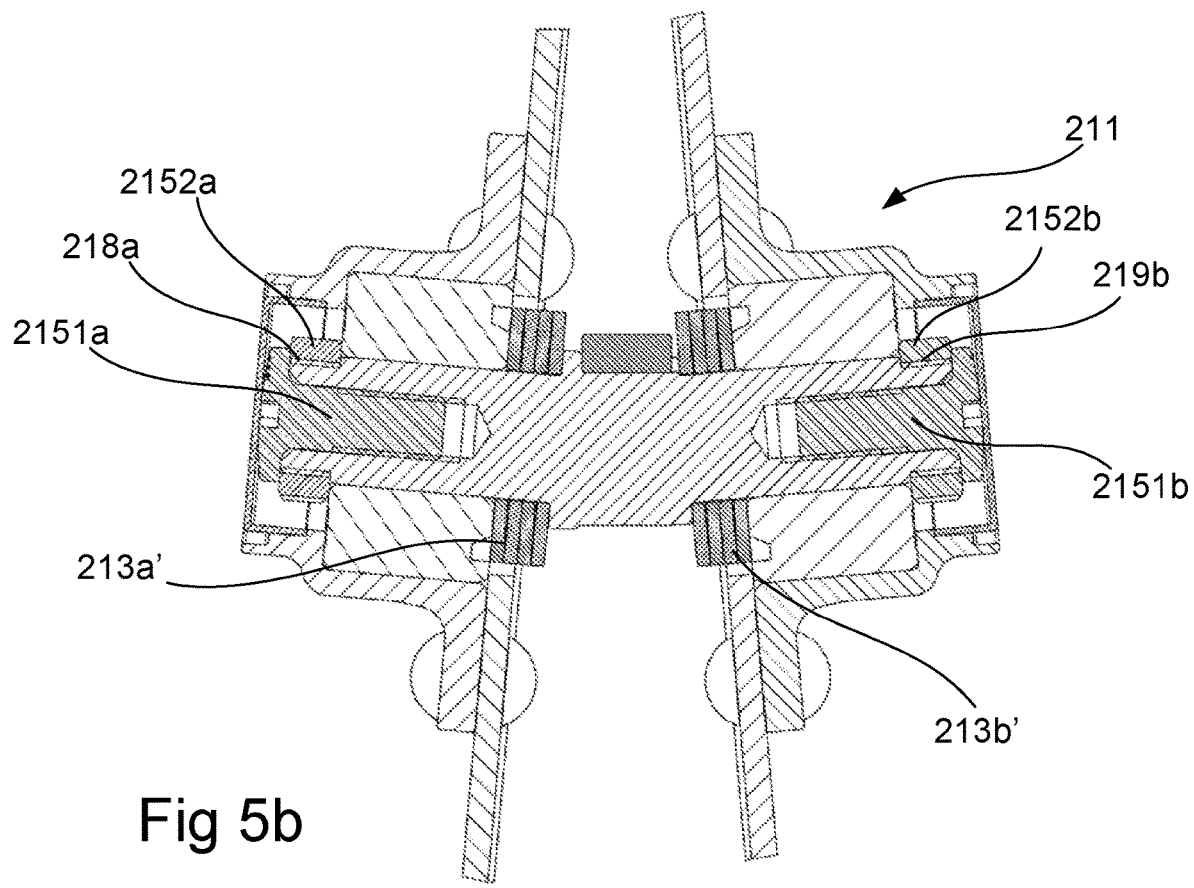
Figure 6:
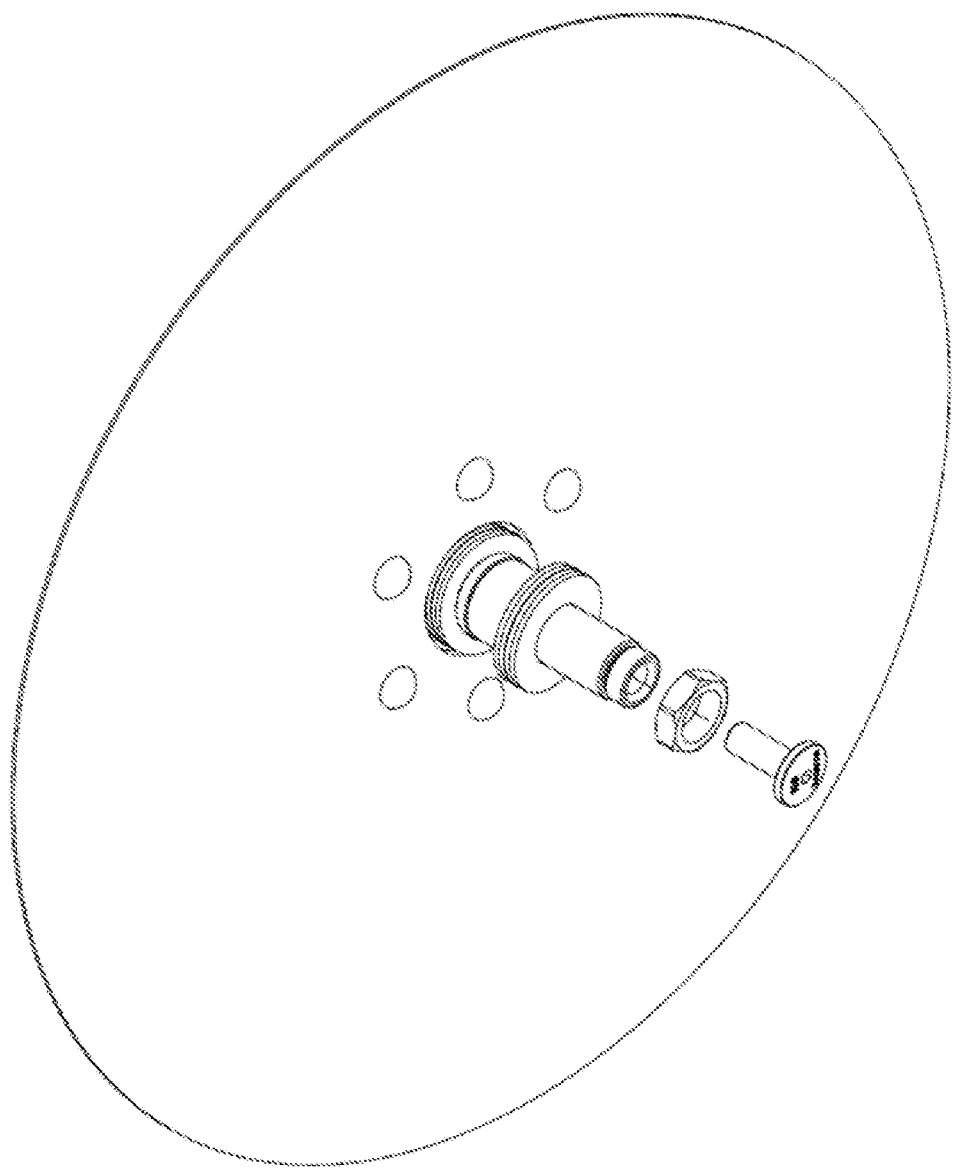
FIG. 6 is an exploded perspective view of a seed disc and hub unit according to the embodiment of FIGS. 5*a*-5*b*.

FIGS. 5a-5b show an embodiment where the bolt 215a, 215b has been replaced with a screw 2151a, 2151b and a nut 2152a, 2152b, and where the head of the screw cooperates with a first axially exposed surface of the nut to lock the axial position of the nut. In the embodiment of FIGS. 5a-5b, the free end of the shaft 212a, 212b has been provided with an outer thread (male thread) 218a, 218b for cooperation with the nut 2152a, 2152b, so that the axial position of the nut 2152a, 2152b along the shaft 212a, 212b is adjustable by turning the nut in engagement with the threads 218a, 218b.

An axially exposed surface of the bearing unit 214a, 214b abuts against a second axially exposed surface of the nut 2152a, 2152b, so that the spring 213a, 213b biases the bearing unit 214a, 214b, and thus the seed disc, against the nut 2152a, 2152b.

Rotation of the nut 2152a, 2152b thus causes adjustment of the axial position of the disc tool along the shaft 212a, 212b.

The head of the screw 2151a, 2151b cooperates with the first axially exposed surface of the nut 2152a, 2152b, to counteract unintentional rotation of the nut 2152a, 2152b and thereby associated accidental axial displacement of the seed discs.

For example, the screw can be biased against the nut.

As a second example, the respective threads of the nut 2152a, 2152b and the screw 2151a, 2151b, which cooperate with the shaft, can be designed with different thread pitches.

As a third example, the nut 2152a, 2152b and the screw 2151a, 2151b may be threaded in different directions, i.e., one of the nut and the screw may be right-threaded and the other one of the nut and the screw may be left-threaded.

Specifically, both sides' screws 2151a, 2151b may be threaded in one and the same direction, such as right-threaded, and both sides' nuts 2152a, 2152b may be threaded in one and the same direction, such as left-threaded.

The threaded portion 218a, 218b may have an axial length which is greater than the axial length of the nut 2152a, 2152b. Thereby it is possible to release the locking of the connection by further tightening the nut 2152a, 2152b, so that the engagement of the nut with the head of the screw 2151a, 2151b is relieved, and loosening of the connection is facilitated.

The invention claimed is:

1. A method of operating a seed furrow opener mounted on an agricultural implement, comprising:
providing a seed furrow opener arm carrying a pair of cooperating seed discs, whose axes of rotation are non-parallel with each other,
providing at least one axially acting spring member on at least one of the shafts,
disposing a seed disc on said at least one of the shafts,
biasing the seed disc against the spring element by means of an adjustable abutment;
wherein at least one of the shafts is formed in one piece with an inner abutment arranged axially inwardly of the at least one axially acting spring member; and
engaging the seed furrow opener with the soil and creating a seed furrow in the soil as the agricultural implement traverses the soil.

2. A seed furrow opener, comprising:
a seed furrow opener arm, and
a pair of cooperating seed discs, whose rotational axes are non-parallel to each other;
wherein at least one of the seed discs is axially slidably mounted on a shaft whose proximal end is attached at the furrow opener arm,
a spring arranged to bias the seed disc outwardly from the seed furrow opener arm, and
an adjustable abutment,
wherein the spring biases the seed disc against the adjustable abutment; and
wherein the shaft is formed in one piece with an inner abutment arranged axially inwardly of the spring.

3. The seed furrow opener according to claim 2, wherein the spring comprises at least one plate spring.

4. The seed furrow opener according to any claim 2, further comprising a roller bearing acting between the seed disc and the shaft, wherein the spring and the adjustable abutment engage with an inner ring of the roller bearing.

5. The seed furrow opener according to claim 2, wherein both seed discs are slidably arranged on their respective shaft and comprise a respective arrangement of outwardly biasing spring and adjustable abutment.

6. A row unit for feeding granular material to ground, comprising a seed furrow opener according to claim 2.

7. A seed furrow opener, comprising:
a seed furrow opener arm, and
a pair of cooperating seed discs, whose rotational axes are non-parallel to each other;
wherein at least one of the seed discs is axially slidably mounted on a shaft whose proximal end is attached at the furrow opener arm,
a spring arranged to bias the seed disc outwardly from the seed furrow opener arm, and
an adjustable abutment,
wherein the spring biases the seed disc against the adjustable abutment; and
wherein the shaft, at a proximal portion thereof, is threadedly mounted to an inner abutment arranged axially inwardly of the spring.

8. The seed furrow opener according to claim 7, wherein the spring comprises at least one plate spring.

9. The seed furrow opener according to any claim 7, further comprising a roller bearing acting between the seed disc and the shaft, wherein the spring and the adjustable abutment engage with an inner ring of the roller bearing.

10. The seed furrow opener according to claim 7, wherein both seed discs are slidably arranged on their respective shaft and comprise a respective arrangement of outwardly biasing spring and adjustable abutment.

11. A row unit for feeding granular material to ground, comprising a seed furrow opener according to claim 7.

12. The seed furrow opener according to claim 7 wherein the shaft has, at a distal portion thereof, an engagement portion for mounting and/or dismounting the shaft.

13. A seed furrow opener, comprising:
a seed furrow opener arm, and
a pair of cooperating seed discs, whose rotational axes are non-parallel to each other;
wherein at least one of the seed discs is axially slidably mounted on a shaft whose proximal end is attached at the furrow opener arm,
a spring arranged to bias the seed disc outwardly from the seed furrow opener arm, and
an adjustable abutment having a threaded portion for engaging the shaft;
wherein the spring biases the seed disc against the adjustable abutment.

14. The seed furrow opener according to claim 13, wherein the adjustable abutment comprises a nut which engages an outer thread provided on the shaft.

15. The seed furrow opener according to claim 14, wherein the adjustable abutment further comprises a screw which engages with an inner thread arranged in the shaft, wherein a head of the screw is abutable against an axially exposed surface of the nut.

16. The seed furrow opener according to claim 15, wherein the screw and the nut have threads with different pitch angles.

17. The seed furrow opener according to claim 15, wherein the screw and the nut have threads with opposite thread directions.

18. The seed furrow opener according to claim 15, wherein the outer thread has a greater axial length than the nut.

19. The seed furrow opener according to claim 18, wherein the seed furrow opener comprises a pair of substantially opposite shafts with a respective adjustable abutment, and wherein a nut associated with an abutment of a first one of the shafts has the same thread direction as a nut associated with an abutment of a second one of the shafts.

20. The seed furrow opener according to claim 13, wherein the adjustable abutment comprises a bolt which engages with an inner thread arranged in the shaft.

21. The seed furrow opener according to claim 13, wherein the spring comprises at least one plate spring.

22. The seed furrow opener according to any claim 13, further comprising a roller bearing acting between the seed disc and the shaft, wherein the spring and the adjustable abutment engage with an inner ring of the roller bearing.

23. The seed furrow opener according to claim 13, wherein both seed discs are slidably arranged on their respective shaft and comprise a respective arrangement of outwardly biasing spring and adjustable abutment.

24. A row unit for feeding granular material to ground, comprising a seed furrow opener according to claim 13.

25. A seed furrow opener, comprising:
a seed furrow opener arm, and
a pair of cooperating seed discs, whose rotational axes are non-parallel to each other;
wherein at least one of the seed discs is axially slidably mounted on a shaft whose proximal end is attached at the furrow opener arm,
a spring concentrically arranged on the shaft and arranged to bias the seed disc outwardly from the seed furrow opener arm, and
an adjustable abutment,
wherein the spring biases the seed disc against the adjustable abutment.

26. An agricultural implement for feeding granular materials to ground over which the agricultural implement is traveling, comprising at least two row units according to claim 25.

27. The seed furrow opener according to claim 25, wherein the spring comprises at least one plate spring.

28. The seed furrow opener according to any claim 25, further comprising a roller bearing acting between the seed disc and the shaft, wherein the spring and the adjustable abutment engage with an inner ring of the roller bearing.

29. The seed furrow opener according to claim 25, wherein both seed discs are slidably arranged on their respective shaft and comprise a respective arrangement of outwardly biasing spring and adjustable abutment.

30. A row unit for feeding granular material to ground, comprising a seed furrow opener according to claim 25.

* * * * *